(12) United States Patent
Lyons et al.

(10) Patent No.: US 7,179,322 B2
(45) Date of Patent: Feb. 20, 2007

(54) OXYGEN AND NITROGEN ENRICHED ATMOSPHERES IN AIRCRAFT

(75) Inventors: Arthur Lyons, Cheltenham (GB); Andrew Van Den Gross, Kent (GB)

(73) Assignee: Smartmembrane Corp., Nassau (BS)

( * ) Notice: Subject to any disclaimer, the term of this patent is extended or adjusted under 35 U.S.C. 154(b) by 113 days.

(21) Appl. No.: 10/636,308

(22) Filed: Aug. 7, 2003

(65) Prior Publication Data

US 2005/0103193 A1   May 19, 2005

(30) Foreign Application Priority Data

Jan. 30, 2003   (GB) ................................ 0302211.8

(51) Int. Cl.
*B01D 53/22*   (2006.01)

(52) U.S. Cl. ..................... 95/47; 96/8; 96/9; 96/10; 96/13; 96/14; 128/205.11; 128/205.12; 128/205.27; 95/54

(58) Field of Classification Search .............. 95/47, 95/54; 96/4, 7–14; 128/205.11, 205.12, 128/205.18, 205.27
See application file for complete search history.

(56) References Cited

U.S. PATENT DOCUMENTS

| | | | | |
|---|---|---|---|---|
| 3,976,451 A | * | 8/1976 | Blackmer et al. ................. 96/7 |
| 4,230,463 A | | 10/1980 | Henis et al. .................... 55/16 |
| 4,508,548 A | | 4/1985 | Manatt ....................... 55/158 |
| 4,527,999 A | | 7/1985 | Lee ........................... 210/654 |
| 4,606,740 A | * | 8/1986 | Kulprathipanja ............... 95/47 |
| 4,776,936 A | * | 10/1988 | Smith et al. ........... 204/157.15 |
| 4,813,983 A | | 3/1989 | Nohmi et al. ................. 55/158 |
| 4,824,444 A | * | 4/1989 | Nomura ......................... 95/54 |
| 4,952,220 A | * | 8/1990 | Langsam et al. .............. 96/13 |
| 4,976,897 A | * | 12/1990 | Callahan et al. ............ 264/425 |
| 5,013,331 A | * | 5/1991 | Edwards et al. ................ 96/8 |
| 5,032,149 A | | 7/1991 | Hayes ........................... 95/53 |
| 5,034,024 A | | 7/1991 | Hayes ........................... 95/54 |
| 5,042,993 A | * | 8/1991 | Meier et al. ................... 95/47 |
| 5,045,093 A | * | 9/1991 | Meier et al. ................... 95/47 |
| 5,049,167 A | * | 9/1991 | Castro et al. .................. 95/55 |
| 5,067,971 A | | 11/1991 | Bikson et al. ................. 95/52 |
| 5,102,552 A | | 4/1992 | Callahan et al. ............ 210/654 |
| 5,157,058 A | | 10/1992 | Dillon et al. ............... 521/134 |

(Continued)

FOREIGN PATENT DOCUMENTS

EP   0248391   12/1987

(Continued)

OTHER PUBLICATIONS

EPODOC/EPO Abstract of Japanese Patent Application No. JP2191533.

(Continued)

*Primary Examiner*—Jason M. Greene
(74) *Attorney, Agent, or Firm*—Ohlandt, Greeley, Ruggiero & Perle, L.L.P.

(57) ABSTRACT

A method of supplying oxygen rich air to the passengers and crew on board a passenger aircraft by use of a highly permeable oxygen enrichment unit, wherein the fiber tubes of the hollow fiber membranes used to separate normal air into oxygen rich and nitrogen rich fractions in the oxygen enrichment unit are subjected to a modification technique before the tubes are coated with a selective polymer.

41 Claims, 4 Drawing Sheets

U.S. PATENT DOCUMENTS

| | | | |
|---|---|---|---|
| 5,158,584 A | * 10/1992 | Tamura | 96/8 |
| 5,286,280 A | * 2/1994 | Chiou | 95/45 |
| 5,356,459 A | 10/1994 | Bikson et al. | 95/54 |
| 5,383,448 A | * 1/1995 | Tkatchouk et al. | 128/205.11 |
| 5,989,319 A | 11/1999 | Kawae et al. | 96/11 |
| 6,017,474 A | 1/2000 | Teo et al. | 264/41 |
| 6,093,238 A | 7/2000 | Huf | 96/8 |
| 6,126,721 A | * 10/2000 | Nemser et al. | 95/54 |
| 6,425,936 B1 | 7/2002 | Sammons et al. | 95/45 |
| 6,503,295 B1 | 1/2003 | Koros et al. | 95/51 |
| 6,540,813 B2 | 4/2003 | Nelson et al. | 95/53 |
| 6,649,559 B2 | 11/2003 | Drost et al. | 502/182 |
| 6,660,062 B2 | 12/2003 | Liu et al. | 95/45 |
| 6,730,145 B1 | 5/2004 | Li | 96/10 |
| 2003/0126988 A1 | 7/2003 | Nelson et al. | 95/53 |

FOREIGN PATENT DOCUMENTS

| | | |
|---|---|---|
| EP | 0405597 A1 | 6/1990 |
| EP | 0405597 A1 | 6/1990 |
| EP | 0422884 A1 | 10/1990 |
| EP | 1206959 A1 | 8/1999 |
| EP | 1108458 A1 | 11/2000 |
| EP | 1108458 A1 | 6/2001 |
| GB | 2192581 A | 1/1988 |

OTHER PUBLICATIONS

EPODOC/EPO Abstract of Japanese Patent Application No. JP2071826.

* cited by examiner

OXYGEN AND NITROGEN ENRICHED ATMOSPHERES IN AIRCRAFT

FIELD OF THE INVENTION

The present invention relates to a composite hollow fibre membrane gas separation system, where the hollow fibre membranes are capable of being modified so that the gas separation system can produce either large volumes of slightly enriched separated gas streams or small volumes of highly enriched separated gas streams.

The gas separation system is able to operate under relatively low differential pressure conditions and the gas separation module that contains the hollow fibre membranes can therefore be made from lightweight materials.

This combination of low pressure operation and light weight makes the gas separation system particularly suitable for passenger aircraft applications. For example, one form of the gas separation system could be used to supply oxygen rich air to passengers in an aircraft, whilst another form of the gas separation system could be used to supply inert nitrogen rich air to the fuel tanks of the aircraft.

DISCUSSION OF THE BACKGROUND ART

Passenger aircraft fly at high altitudes in order to conserve fuel and achieve an adequate flight range. For example, large passenger aircraft typically cruise at a height of between 7500 meters and 14000 meters, whilst Concorde can cruise at 18000 meters or more.

Although the proportion of oxygen in the atmosphere remains constant irrespective of altitude, i.e. the air composition remains at 21% oxygen, 79% nitrogen, as altitude increases the atmospheric pressure decreases, as illustrated in Table 1.

TABLE 1

Ambient Pressure at Different Altitudes

| Altitude Feet | Altitude Metres | Ambient Pressure Kpa | Ambient Pressure Psi |
|---|---|---|---|
| 0 | 0 | 101.4 | 14.7 |
| 4750 | 1448 | 84.0 | 12.19 |
| 8000 | 2438 | 76.7 | 10.83 |
| 10000 | 3048 | 72.0 | 10.44 |
| 12000 | 3658 | 64.0 | 9.28 |
| 15000 | 4572 | 57.4 | 8.35 |
| 17500 | 5334 | 50.7 | 7.35 |
| 25000 | 7620 | 38.6 | 5.6 |
| 36000 | 10973 | 22.7 | 3.29 |
| 40000 | 12192 | 18.7 | 2.71 |
| 44000 | 13411 | 16.0 | 2.32 |
| 60000 | 18288 | 7.3 | 1.06 |

A decrease in atmospheric pressure is accompanied by a reduction in the ability of humans to transfer oxygen from the lungs to the bloodstream. As altitude increases, the atmospheric pressure falls and humans become much more vulnerable to the effects of hypoxia.

To protect passengers and crew from hypoxia, passenger aircraft flying above 3000 meters have to be pressurised to compensate for the reduced atmospheric pressure.

To allow aircraft to be pressurised, the fuselage of aircraft has to be strengthened, so that the fuselage can act as a pressure vessel able to contain an internal pressure much higher than the external atmospheric pressure. Strengthening the fuselage increases the cost of an aircraft, and the increased weight of the fuselage also has a significant impact on the fuel consumption and potential range of the aircraft.

In order to reduce the amount of strengthening required to the aircraft fuselage, the cabin pressure is usually maintained at about 76.7 kPa, i.e. 10.83 psi. This pressure is equivalent to the ambient pressure at an altitude of 8000 feet, i.e. 2,500 meters, rather than the ambient pressure of 101.4 kPa that prevails at sea level. Pressurising the aircraft to only 76.7 kPa saves weight and reduces operating costs.

However, the partial pressure of the oxygen inside an aircraft pressurised to 76.7 kPa is about 25% less than the corresponding pressure at sea level, and prolonged exposure to this lower partial pressure could still have an adverse affect on the health of passengers. The cabin pressure in commercial passenger aircraft is therefore a compromise between the degree of hypoxia that passengers and crew are expected to be able to tolerate, and the strength and weight of the aircraft.

Decisions regarding the optimum cabin pressure to be used inside passenger aircraft were made at a time when passenger numbers were much lower than today and also when far fewer passengers participated in long-haul flights. It was probably also assumed at the time that most airline passengers were fit and healthy, whereas many passengers travelling today are elderly, some are obese and some suffer from ailments that make them much more vulnerable to hypoxia.

For example, passengers particularly at risk of hypoxia include those with pulmonary and heart diseases who find breathing difficult and have impaired oxygen uptake even under normal atmospheric conditions. Their breathing difficulties would be exacerbated under reduced oxygen partial pressure conditions, and hypoxia in such vulnerable passengers could well precipitate heart attacks and strokes during flight.

There is also an increased risk of clots forming in the deep veins of legs, particularly during long-haul flights because of the combination of hypoxia and long periods of immobility inside aircraft cabins, and such deep vein clots could lead to pulmonary embolism after landing.

The incidence of passengers suffering from hypoxia related ailments does appear to be on the increase. Worryingly, cases have also been reported where fit, younger, passengers have apparently suffered from hypoxia related illnesses either during or after long-haul flights.

The number of flights to long-haul destinations has increased dramatically over recent years and many more passengers are now being subjected to reduced atmospheric pressure conditions and inactivity for longer periods of time. The apparent spread of hypoxia related ailments to younger people also suggests that this combination of poor atmospheric conditions and immobility may well be of concern to all passengers, irrespective of their age, health and general fitness.

Modern passenger aircraft are equipped with sophisticated air conditioning systems. The air conditioning systems have primarily been designed to prevent an excessive build up of carbon dioxide in the breathable air inside passenger cabins, whilst also providing a comfortable in-flight environment for passengers.

Carbon dioxide in the atmosphere inside aircraft can come from the vapourisation of dry ice, which is used to chill food in the galleys, as well as from human respiration. Carbon dioxide is an asphyxiant, and as little as a 2% concentration of carbon dioxide in the atmosphere can initiate headaches, increase blood pressure and cause deeper respiration. The air transport regulatory authorities specify that 3% is the maximum amount of carbon dioxide allowed in the breathable air inside passenger aircraft, although 3% carbon dioxide is known to produce weak narcosis in some people.

Understandably, from a passenger health and safety point of view, the prevention of excessive build-up of carbon dioxide has always been regarded as the most important requirement of an aircraft air conditioning system. The amount of carbon dioxide in the atmosphere inside the passenger cabins is controlled by regularly replenishing the air inside the aircraft with fresh compressed air supplied by the engines.

However, there are cost implications in taking compressed air from the engines for use other than for motive power. For example, a typical aircraft air conditioning system could well account for between 3% and 4% of the total aircraft fuel consumption. To help control these energy costs, about 40% of the stale air extracted from passenger cabins is recirculated and reused inside the aircraft.

The stale air is filtered, to remove airborne aerosols and dust, and the filtered air is then mixed with fresh compressed air from the engines before being recirculated back into the passenger cabins. The recirculated air will, however, contain less oxygen and more carbon dioxide than the fresh compressed air supplied by the engines, because the recirculated air will already have been used for respiratory purposes.

An important benefit associated with the reuse of air from the passenger cabins is that the stale air contains moisture from the respiration of passengers, whereas the fresh compressed air from the engines tends to be extremely dry. The recirculated air therefore provides the humidity needed to prevent the dehydration of passengers.

Maintaining passenger comfort is also an important feature of an aircraft conditioning system. For example, changes in cabin pressure during take-off and landing are carefully controlled by the air supply system, to ensure that the ear drums of passengers are not subjected to sudden or excessive stress. During flight, the air inside the passenger cabins is maintained at temperature, humidity, pressure and flow rate conditions that provide a comfortable as well as a safe environment to passengers.

Until recently, however, very little attention has been given to the concentration of oxygen in the breathable atmosphere supplied to passengers inside aircraft. For example, an alternative to pressurising passenger aircraft, in order to provide an acceptable partial pressure of oxygen, would be to increase the amount of oxygen in the breathable air supplied to the passengers.

This is in fact the approach used for military aircraft, where it is common practice for the pilot to have an individual supply of oxygen to compensate for the reduced partial pressure of oxygen at high attitudes. From a military point of view, using oxygen to improve breathing has the advantage that the military aircraft can be kept as light as possible because they are not pressurised to the same degree as passenger aircraft.

However, modern passenger aircraft carry large numbers of passengers, and it is not practical to use pure oxygen to increase the oxygen concentration in the breathable atmosphere inside the aircraft. For example, packaged oxygen, i.e. oxygen in the form of either compressed gas in cylinders or liquid in tanks, would not only be extremely expensive, but would also have serious weight implications for the aircraft.

Oxygen production systems, such as pressure swing adsorption, vacuum swing adsorption and cryogenic systems, are commercially available to produce either pure or high purity oxygen for industrial processes.

However, industrial oxygen production systems are very large, heavy and energy intensive, and such systems are not a practical solution for passenger aircraft applications.

There are also significant safety implications associated with the storage and use of pure oxygen. For example, pure oxygen encourages spontaneous combustion, and care has to be taken at all times to ensure that pure oxygen is always isolated and kept well away from fuels and other combustible materials.

The alternative to using pure oxygen would be to use an oxygen concentrator, which uses gas separation membranes to separate normal atmospheric air into an oxygen rich fraction and a nitrogen rich fraction.

An earlier European patent application by the applicant, EP 0808769 A, filed on the $20^{th}$ May 1997, described how, in theory, oxygen concentrators could be used to supply enriched oxygen air to the passenger cabins of aircraft. However, very high volumes of air are required to conform with the passenger air supply regulations specified by the air transport authorities, and the industrial oxygen concentrators available at the time of the above patent application were unable to efficiently supply such large amounts of enriched oxygen air.

For example, the air transport regulatory authorities specify that each passenger should be supplied with about 10 $ft^3$/min of fresh air. On large passenger aircraft, which can carry up to 550 passengers plus crew, this amount of fresh air per passenger would be equivalent to a total air supply of some 6000 $ft^3$/min, i.e. about 165 $m^3$/minute.

Industrial oxygen concentrators generally have relatively low gas flux and they usually require high operating pressures, of at least 7-bar pressure, to force the air through the gas separation membranes inside the concentrator. The need to use high pressure to produce the oxygen rich air imposes high energy demands on the gas separation system, and their low gas flux also limits the volume of oxygen rich air that can be produced from such concentrators.

Because of their high pressure operation, industrial oxygen concentrators have to be made from heavy, pressure resistant materials. It is therefore impractical to use industrial oxygen concentrators to produce the large amounts of oxygen rich air needed to meet the requirements of a typical passenger aircraft air conditioning system.

SUMMARY OF THE INVENTION

The present invention seeks to provide a composite hollow fibre gas separation system that is able to supply the large volumes of enriched oxygen air required to provide an adequate air supply to passengers on board an aircraft.

The production of large amounts of enriched oxygen air is achieved by manufacturing the composite hollow fibre gas separation membrane in such a way that the membrane has high gas permeability combined with a reasonable degree of gas selectivity.

A preferred method of manufacture is described in UK Patent Application No. 0302211.8, whose disclosure is incorporated herein in its entirety by reference.

The gas separation system also operates at relatively low differential pressures, and the gas separation unit containing the hollow fibre membranes can therefore be manufactured from relatively lightweight materials. The gas separation system is therefore particularly suitable for aircraft applications, where weight as well as high volume production is important.

From a first broad aspect, therefore, the invention provides a method of producing large volumes of enriched oxygen air in an energy efficient manner, and by means of a relatively lightweight gas separation unit, so that the gas separation system is capable of being used on board a passenger aircraft to increase the concentration of oxygen in the breathable air supplied to the passengers on board the aircraft.

The gas separation system is able to produce enough enriched oxygen air to meet the air supply regulations of the air transport authorities, i.e. each passenger should receive 10 ft$^3$/min of fresh air, which is equivalent to a total air supply of 6000 ft$^3$/min, or about 165 m$^3$/min, on a typical large passenger aircraft.

A 1% increase in the concentration of oxygen in air inhaled at altitude is approximately equivalent to a drop in altitude of 350 meters. Table 2 illustrates the oxygen content that would be required at different altitudes to provide a breathable atmosphere equivalent to the normal atmospheric condition prevailing at sea level.

TABLE 2

| Height above sea level Metres | Approximate oxygen content required to equate to ambient sea level conditions |
|---|---|
| 0 | 21% |
| 350 | 22% |
| 698 | 23% |
| 1046 | 24% |
| 1394 | 25% |
| 1742 | 26% |
| 2090 | 27% |
| 2438 | 28% |

For passenger aircraft applications, the gas separation system should preferably be able to produce enriched air with enough oxygen to off-set the reduced partial pressure of oxygen in the passenger cabins of a normal pressurised aircraft.

Passenger aircraft are currently pressurised so that their internal pressure is equivalent to the atmospheric pressure which exists at a height of about 8000 feet, i.e. 2438 meters, above sea level. As shown in Table 2, to provide a breathable atmosphere inside the pressurised aircraft that would be equivalent to ambient sea level conditions, the gas separation system should therefore ideally be able to produce enriched oxygen air containing an extra 7% oxygen, i.e. enhanced air with a composition of 28% oxygen, 72% nitrogen.

A very large gas separation system would be required to continually supply each passenger with 10 ft$^3$/min of enriched oxygen air containing an extra 7% oxygen, and this would probably not be practical at the present time because of the space restraints inside existing passenger aircraft.

However, an enriched oxygen atmosphere containing less oxygen, for example 3% to 4% extra oxygen, would still be much better for the health of passengers than the compressed air currently supplied to the passenger cabins in an aircraft. For example, 4% extra oxygen in the breathable air inside an aircraft, i.e. an air composition of 25% oxygen, 75% nitrogen, would be equivalent to a reduction in flying altitude of about 1400 meters or an increase in cabin pressure of about 14 kPa.

Enriched oxygen rich air would be beneficial to the health of both passengers and crew, and would undoubtedly help to protect passengers from hypoxia related ailments, especially if the enriched oxygen air was used in conjunction with other precautions that have been suggested to prevent pulmonary embolism, such as exercise during flight and reduced alcohol intake.

Table 3 provides details of a composite hollow fibre gas separation system, as described in the invention, which is able to produce sufficient enriched oxygen air to meet the air supply requirements of a typical large passenger aircraft.

TABLE 3

Oxygen Enrichment System

| Property | Typical Value |
|---|---|
| Operating differential pressure | 30 psi positive or 0.5 bar negative |
| Operating temperature range | −30° C. to +80° C. |
| Optimum operating temperature | 20° C. to 25° C. |
| Composition of oxygen rich air from the system | About 29.5% oxygen, 70.5% nitrogen |
| Volume of oxygen rich air from the system | Up to 79.7 m$^3$/minute |
| Volume of 25% oxygen, 75% nitrogen air | Up to 167 m$^3$/minute, after dilution |
| Estimated weight of gas separation system | About 1 tonne |
| Estimated volume of gas separation system | About 4 m$^3$ |
| Equivalent energy consumption, vacuum operation | About 240 kWhr/tonne of added oxygen |

To effect gas separation, a pressure differential is required between the outside wall and the inside core of the hollow fibre membranes. The pressure differential can either be a positive pressure of about 30 psi applied to the outer wall of the membrane or alternatively a negative pressure of about 0.5 atmospheres applied to the inner core of the membrane.

Although nitrogen rich air is produced as the retentate gas stream from the oxygen enrichment unit, its nitrogen content is not high enough to allow the nitrogen rich air to be used as an inert atmosphere inside an aircraft.

A second, much smaller, gas separation unit, containing composite hollow fibre membranes with a higher degree of oxygen to nitrogen selectivity, would be used to produce air enriched with sufficient nitrogen to provide an inert atmosphere inside the aircraft, i.e. air with a composition of 10% oxygen, 90% nitrogen.

Table 4 provides brief details of a nitrogen enrichment system that could provide highly enriched nitrogen air for aircraft applications.

TABLE 4

Nitrogen Enrichment System

| Property | Value |
|---|---|
| Operating Pressure | 29 psi pressure |
| Operating Temperature | 20° C. to 25° C. |
| Composition of nitrogen rich air from the system | 10% oxygen, 90% nitrogen |
| Volume of nitrogen rich air from the system | Up to 22 m$^3$/hour |

From a further aspect therefore, the invention provides a means of supplying large volumes of enriched oxygen air from an oxygen enrichment unit, to provide an improved breathable atmosphere to the passengers and crew on board an aircraft, and small volumes of highly enriched nitrogen air from a nitrogen enrichment unit, to provide an inert atmosphere for the fuel tanks and other non-passenger areas of the aircraft.

BRIEF DESCRIPTION OF THE DRAWINGS

The composition of the composite hollow fibre membranes, the construction of a typical gas separation module utilising the membranes, and the application of oxygen and nitrogen enrichment systems to passenger aircraft will now be described with reference to FIGS. 1, 2 3 and 4 where.

DETAILED DESCRIPTION OF THE PREFERRED EMBODIMENT

Figure 1:
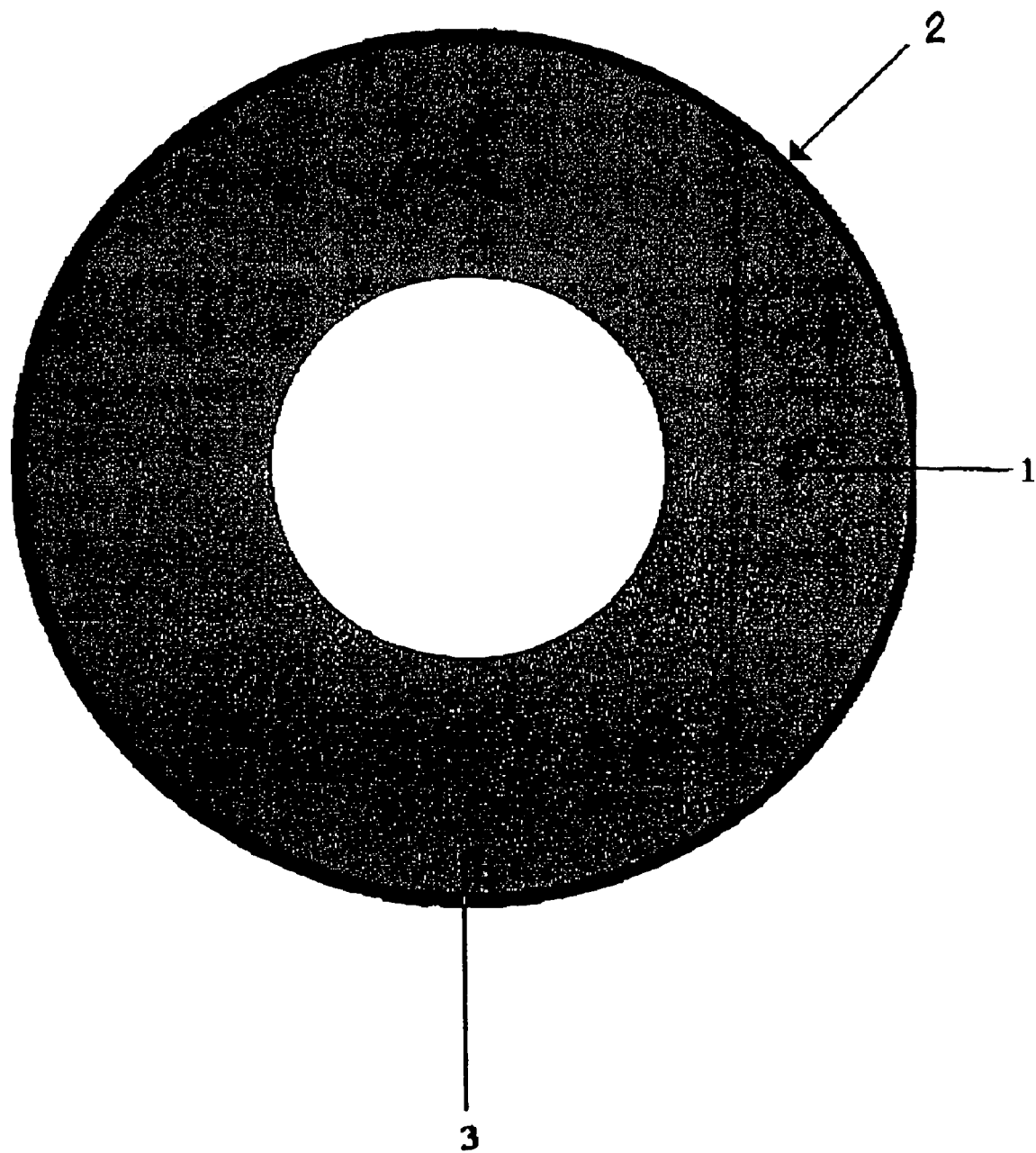
FIG. 1 is a schematic cross-sectional view of the composite hollow fibre membrane.

The basic construction of the composite hollow fibre membrane is illustrated in FIG. 1. A very porous hollow fibre tube 1, manufactured from polyethersulfone polymer, supports a very thin layer 2 of selective polymer coated onto the outer surface 3 of the fibre tube 1. The selective polymer consists of a mixture of non cross-linked polydimethylsiloxane and cross-linked polydimethylsiloxane Both polyethersulfone and polydimethylsiloxane are widely used to manufacture hollow fibre membranes and their physical and chemical resistance properties are well known and well understood.

The hollow fibre tube is manufactured by extruding polyethersulfone polymer solution through a triple spinneret, and the extrusion conditions are controlled so as to provide a very porous fibre tube structure.

A particular feature of the hollow fibre tube used in the aircraft gas separation system is that, after extrusion, the polyethersulfone fibre is subjected to a special modification technique that increases the porosity of the fibre tube.

The modification technique involves soaking the outer surface of the fibre tube with a solution of acetone and water until the liquid mixture penetrates into the exposed open pores of the fibre tube. The solution of acetone and water is displaced with distilled water, and the water is then quickly dried from the fibre tube. The surface tension of the water pulls on the polymer substructures located within the fibre tube until eventually the substructures fracture.

The fibre tube is subjected to repeated soaking and drying cycles until eventually many new pores and new substructures are formed within the fibre. The resulting modified fibre tube that can have up to twice as many pores in its structure as unmodified fibre, which in turn provides much higher gas permeability properties than a normal polyethersulfone fibre tube.

The modification technique also improves the surface characteristics of the fibre tube so that the outer surface of the tube is able to take a very thin, uniform, defect free layer of selective polydimethylsiloxane polymer.

The combination of a very porous fibre tube and a very thin coating of selective polymer on the outside of the fibre tube results in a composite hollow fibre membrane that has high gas permeability and a reasonable degree of gas selectivity.

This combination of properties makes the hollow fibre membranes particularly suitable for the production of very large amounts of enriched oxygen air, as is required in passenger aircraft applications.

When necessary, the gas separation properties of the modified composite hollow fibre membranes can be further adjusted by subjecting the outer coated surface of the membranes to a plasma discharge treatment technique. For example, to produce air that is sufficiently enriched with nitrogen to provide an inert atmosphere inside the fuel tanks of the aircraft, the modified hollow fibre membranes would be plasma treated in order to increase the selectivity properties of the membranes.

Coated hollow fibres are placed between two cooled copper electrodes in a plasma chamber and the space between the electrodes can be varied from 15 to 30 cm. The pressure inside the chamber is maintained at between 0.1 and 10 torr, and a typical pressure would be 1 to 2 torr. The chamber contains a plasma forming gas, such as nitrogen, oxygen, argon, helium or carbon dioxide, or mixtures of such gases in various proportions. The gas flux can vary between 0.1 and 100 $cm^3$/sec and would typically be about 1 $cm^3$/sec.

A typical voltage of 500 volts on the high-frequency electrodes produces a high-frequency plasma discharge, and the coated fibres can be subjected to the plasma discharge for varying lengths of time, with a typical time being 10 seconds. The plasma treatment technique can be repeated a number of times, under the same or differing conditions, until the hollow fibre membranes have attained the required selectivity and gas separation properties.

From a further aspect therefore, the hollow fibre membranes intended for passenger aircraft applications can be especially manufactured to provide the specific gas separation properties that are required for either oxygen enrichment or nitrogen enrichment purposes. For example, subjecting the hollow fibre tube to a modification technique results in a composite hollow fibre membrane with high permeability properties that is able to produce large volumes of enriched oxygen air, whilst subjecting the coated modified fibre tube to a plasma treatment technique results in a composite hollow fibre membrane with high selectivity properties that is able to produce smaller volumes of highly enriched nitrogen air.

Figure 2:
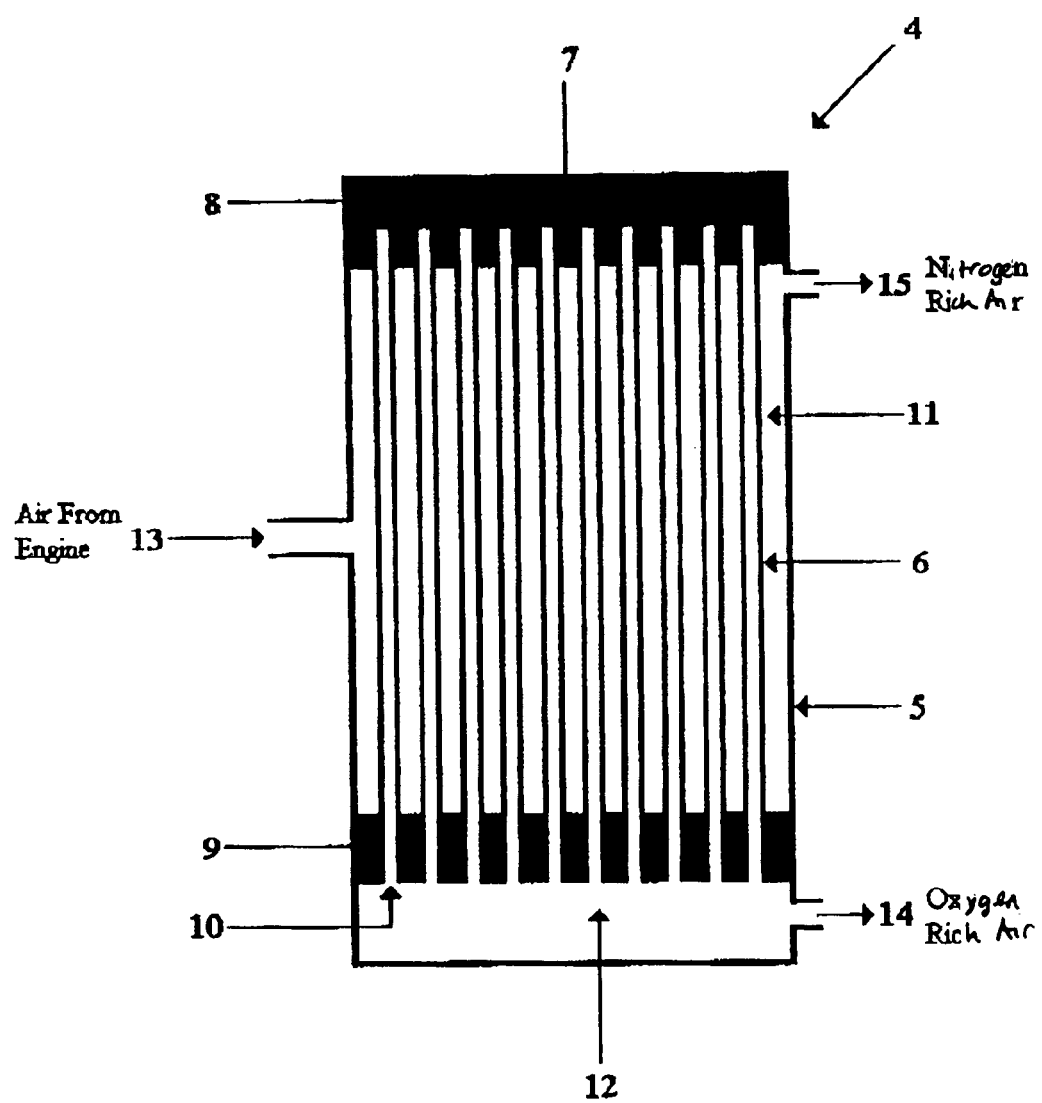
FIG. 2 is a schematic cross-sectional view of a typical gas separation module.

FIG. 2 illustrates how the composite hollow fibre membranes are located inside a typical gas separation module as would be used for either oxygen or nitrogen enrichment purposes.

The module as illustrated in FIG. 2 is particularly suitable for operation under positive differential pressure conditions, i.e. for applications where a positive pressure is applied to the outside of the membranes to effect gas separation.

The gas separation module 4, which can be of either a cylindrical or a rectangular elongated shape, contains a large number of densely packed hollow fibre membranes 6 that are aligned in a substantially parallel manner.

The membranes 6 are positioned inside module 5 so that when compressed air from an aircraft engine is introduced into the module, the air is able to move freely between and around the outside surfaces of the hollow fibre membranes.

The hollow fibre membranes 6 are located inside module 4 so as to form a retentate chamber 11 and a permeate evacuation chamber 12.

The retentate chamber 11 would simultaneously contain compressed air from the engine, which is continually entering module 4 through air inlet 13, and retentate nitrogen rich air left from the gas separation process. The evacuation chamber 12 contains the permeate oxygen rich air from the gas separation process.

The top end 8 of each hollow fibre membrane is located in a bed 7 of a suitable potting compound, such as polyurethane, so that the top end is completely sealed. The bottom end 10 of each membrane is located in a bed of potting compound 9 so that the bottom end is open and leads to the evacuation chamber 12.

Compressed air from the engine, at a pressure of 30 psi, enters module 4 through port 13, and the positive pressure on the outside of the membranes 6 forces the air through the selective coating on the membranes so that the air is selectively enriched with oxygen when it enters the evacuation chamber 12.

The permeate enriched oxygen air would have a typical composition of about 29.5% oxygen, 70.5% nitrogen, and the oxygen rich air evacuates from port 14 for transfer to the passenger cabins of the aircraft.

The retentate nitrogen rich air that remains on the outside of the hollow fibre membranes 6 in chamber 11 would have a typical composition of 20% oxygen, 80% nitrogen and would be at a pressure of about 29 psi. This particular composition of nitrogen rich air does not contain enough nitrogen to allow the gas to be used as an inert atmosphere in an aircraft.

The gas separation module can be varied in size to suit particular end-use applications, and the module would contain the appropriate membranes required for specific end-uses, i.e. either oxygen enrichment or nitrogen enrichment.

For applications requiring large volumes of enriched oxygen air, as is the case on board a passenger aircraft, modules can be combined together in multiples and operated in parallel. In contrast, the module unit needed to produce the relatively low volumes of inert nitrogen rich air required on board an aircraft would be much smaller.

Passenger aircraft already have complex air conditioning systems fitted inside the aircraft. Although air conditioning systems vary between different models of aircraft, all systems typically include heat exchangers, pressure valves, regulating valves, air flow controls, fans and filters, as well as means to mix fresh compressed air and recirculated stale air before the air is supplied to the passenger cabins of the aircraft. The air supply systems also include an outflow valve, which controls the discharge of stale air from the aircraft and helps to regulate the pressure inside the passenger cabins.

The oxygen enrichment system would become an integral part of the air conditioning systems already fitted into aircraft. The best location for the oxygen enrichment system, within existing aircraft air conditioning systems, will be dependent, to a degree, on the temperature and pressure of the compressed air required by the gas separation unit, and also on how equipment already in the air conditioning system, such as heat exchangers, regulating valves, fans and control systems, could be best utilised by the oxygen enrichment unit.

For example, the enriched oxygen air from the gas separation unit has to be mixed with fresh compressed air from the engines to provide the correct composition of oxygen rich air for the passengers on the aircraft. Enriched oxygen air to the correct composition also has to be mixed with recirculated cabin air, and the mixed air has to be at the correct temperature, pressure and flow rate before being admitted into the passenger cabins of the aircraft.

Two alternative methods of utilising the oxygen enrichment and nitrogen enrichment gas separation systems in an aircraft are therefore described with reference to FIGS. 3 and 4.

Figure 3:
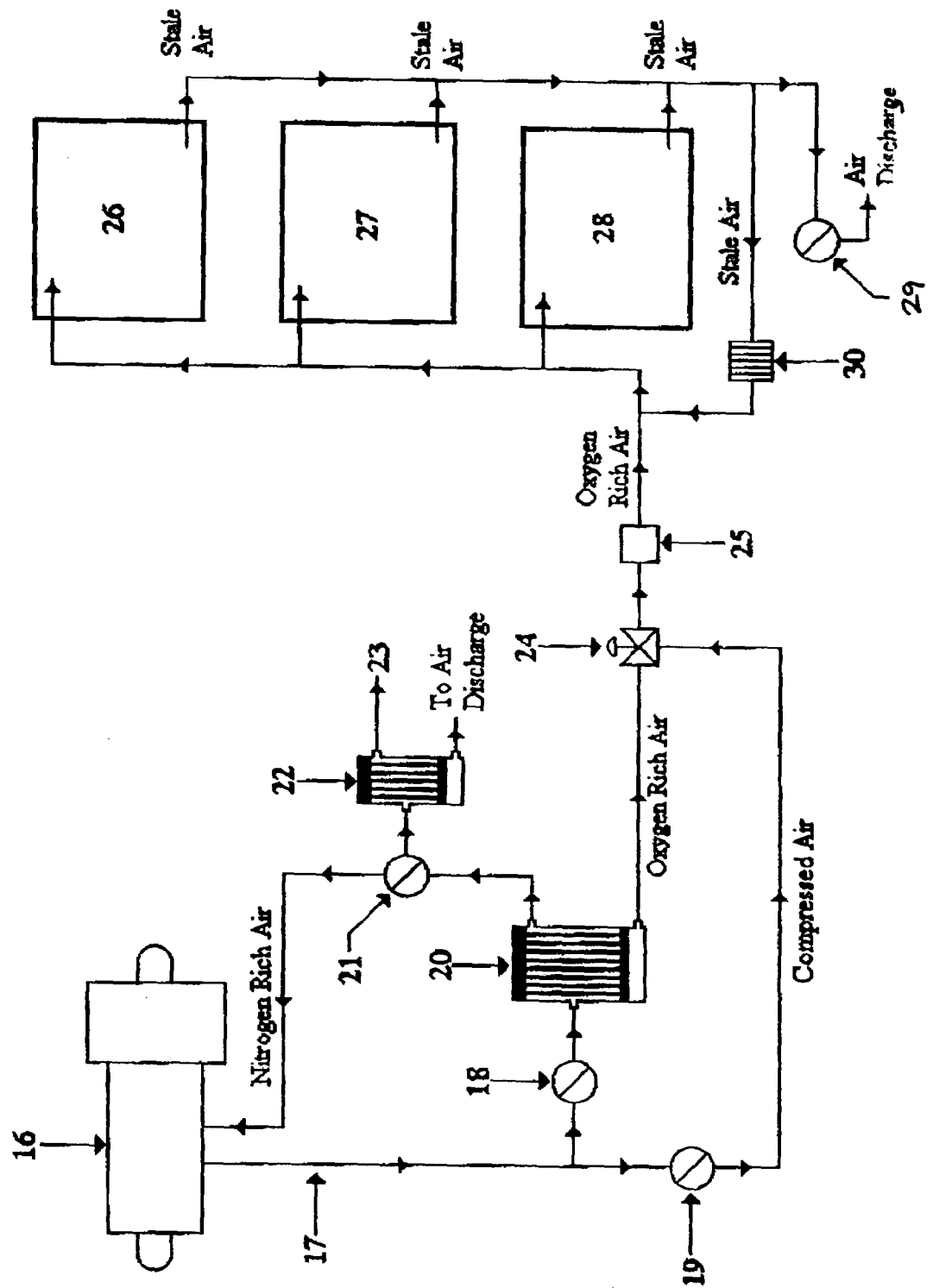
FIG. 3 is a first schematic representation of oxygen and nitrogen enrichment systems on board a passenger aircraft.

In FIG. 3, the oxygen enrichment unit 20 is located in the high pressure compressed air supply 17 coming from an aircraft jet engine 16. (In practise, more than one engine or all of the aircraft engines may be used to supply compressed air to the air conditioning system installed in the aircraft). A bleed air regulating valve 19, in conjunction with other valves located in the aircraft air conditioning system, controls the pressure of the compressed air used to pressurise the aircraft.

For example, valve 19, along with other valves, would be operated so as to gradually pressurise the aircraft during take-off, maintain the cabin pressure whilst the aircraft is in flight at its cruising altitude, and then de-pressurise the aircraft during landing.

In the system illustrated in FIG. 3, once the aircraft has reached its cruising altitude after take-off, another regulating valve 18 would divert compressed air to an oxygen enrichment gas separation unit 20. In this particular system, the gas separation would be achieved by supplying compressed air from valve 18 at a positive pressure of 30 psi to the outside of the hollow fibre membranes in the gas separation unit 20.

Before entering the gas separation unit 20, the compressed air would have passed through heat exchangers, which are already an integral part of the aircraft air conditioning system, so that the compressed air would be at a suitable temperature to eventually provide a comfortable environment for passengers on board the aircraft, i.e. typically a temperature of between about 20° C. to 25° C. (The heat exchangers are not illustrated in FIG. 3).

To supply the large amount of enriched oxygen air required on board a passenger aircraft, the oxygen enrichment unit 20 would actually be a multiple combination of gas separation modules set up to operate in parallel as a single unit.

The permeate oxygen rich air fraction coming from the gas separation unit 20 would typically consist of 29.5% oxygen, 70.5% nitrogen. The enriched oxygen air is fed to a regulating valve 24, which dilutes the oxygen rich air with fresh compressed air until the enriched oxygen air reaches a composition of 25% oxygen, 75% nitrogen. Regulating valve 24, along with bleed valve 19, would also adjust the pressure of the air mixture so that it was at the correct pressure to pressurise the passenger cabins of the aircraft, i.e. about 10.8 psi.

The fresh compressed air, supplied by bleed valve 19, would already have passed through heat exchangers (not shown in FIG. 3) to bring the temperature of the compressed air to the required passenger cabin temperature.

The dilution process carried out by valve 24 would be controlled in dependence on an oxygen sensor 25, which continually measures the oxygen concentration in the enriched oxygen air being supplied to the passenger cabins of the aircraft. Regulating valve 24 would continually adjust the relative composition of enriched oxygen air and normal air so as to maintain an enriched air supply of 25% oxygen, 75% nitrogen to the passengers on the aircraft.

A limitation of operating the oxygen enrichment unit 20 under positive pressure, the system as illustrated in FIG. 3, is that very large amounts of air would have to be continually compressed by the aircraft engines, in order to produce sufficient enriched oxygen air from the gas separation unit 20 to supply the requirements of a typical passenger aircraft.

However, the retentate nitrogen rich air coming from the gas separation unit 20 would still be at a relatively high pressure of about 29 psi. It should therefore be feasible to recover a large part of the energy available in the retentate air stream by, for example, returning the high-pressure retentate air back to engine 16 so that it can contribute towards the motive power produced by the engine.

The retentate nitrogen rich air fraction from the oxygen enrichment unit 20 would have a composition of about 20% oxygen, 80% nitrogen, and would not contain enough nitrogen to be used as an inert atmosphere. Before passing the high pressure retentate air stream back to engine 16, valve 21 would divert part of the retentate air to a small nitrogen enrichment unit 22 that contains membranes with high oxygen to nitrogen selectivity properties.

The highly enriched nitrogen air 23 from gas separation unit 22 would have a composition of about 10% oxygen, 90% nitrogen, ideal for use as an inert atmosphere in the aircraft fuel tanks and in other non-passenger areas, such as engineering and control departments, which may also benefit from an inert atmosphere.

The small amount of permeate oxygen rich air from the nitrogen enrichment unit 22 would be discharged to the outside atmosphere.

The enriched oxygen air from regulating valve 24, with the required composition of 25% oxygen, 75% nitrogen, would be mixed with recirculated cabin air before being supplied to the enclosed spaces used by passengers and crew. In FIG. 3, the enclosed spaces are schematically represented, by way of illustration, as the cockpit, galleys and crew quarters 26 and passenger cabins 27 and 28.

Before entering the enclosed spaces, the temperature, pressure and flow rate of the mixed air would be adjusted, if necessary, by the heat exchangers and other control equipment already located in the aircraft air conditioning system, in order to provide a comfortable environment for passengers and crew. The oxygen enrichment process would therefore be controlled as an integral part of the aircraft air conditioning system from the cockpit of the airplane.

During the flight, the air inside the passenger cabins is frequently changed. Stale air from spaces 26, 27 and 28 would be extracted by fans and filtered through filter 30, to remove aerosols and dust.

The recirculated air would then be mixed with the fresh pressurised enriched oxygen air supplied from regulating valve 24 before being returned to the passenger cabins. An air outflow valve 29 controls the discharge of stale air from the aircraft and helps to regulate the aircraft cabin pressure.

During descent at the end of the flight, the oxygen enrichment system would gradually be closed down by the regulating valves 18 and 24, so that on landing the air supplied to the passenger cabins would have returned back to normal ambient ground level conditions.

Figure 4:
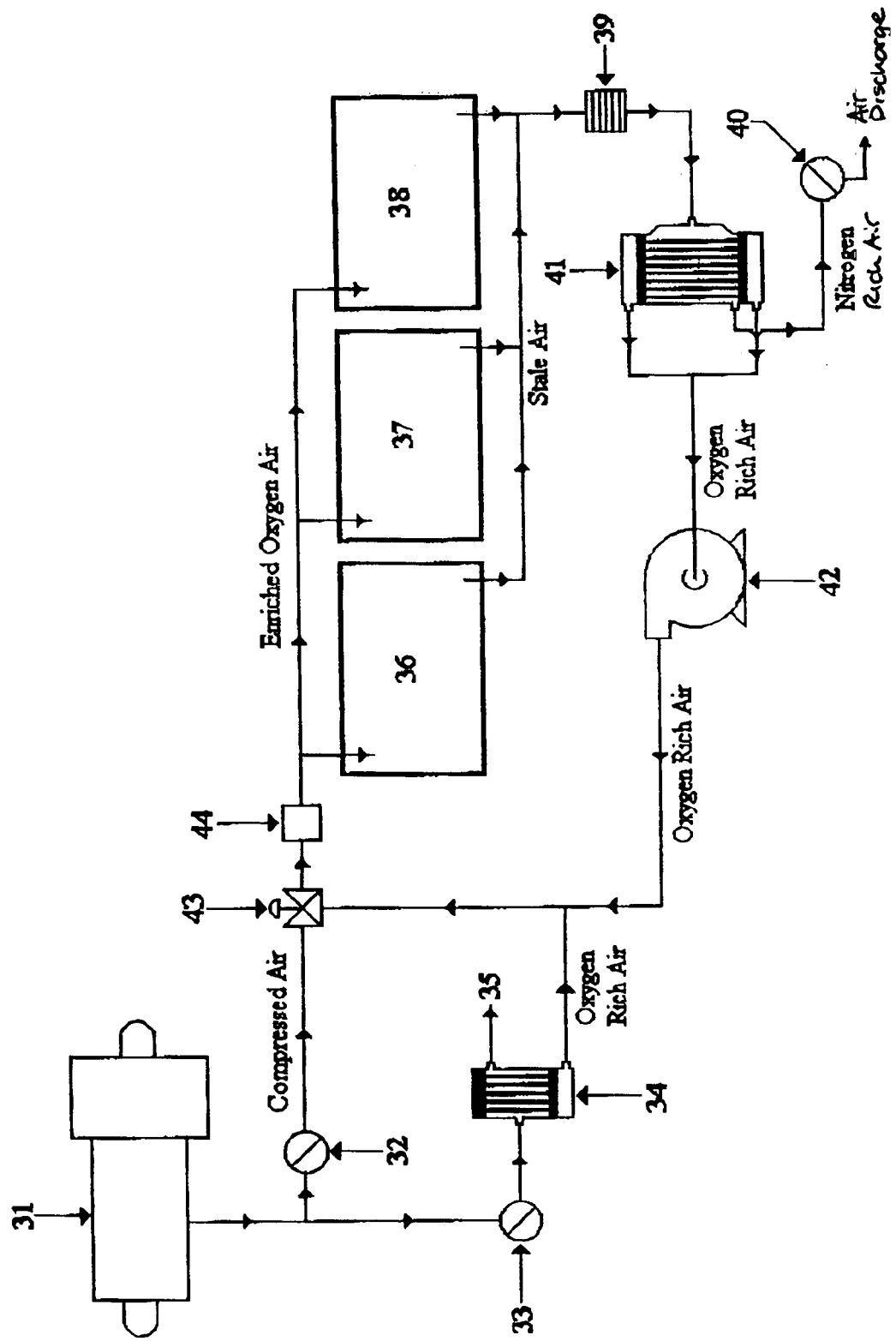
FIG. 4 is a second schematic representation of oxygen and nitrogen enrichment systems on board a passenger aircraft.

By way of example, FIG. 4 illustrates an alternative location for the oxygen enrichment unit. In FIG. 4 the oxygen enrichment unit is positioned in the cabin air recirculation system instead of in the compressed air supply coming from the engines.

The pressure of the compressed air from the engine 31 is controlled by bleed valve 32 before the compressed air passes to a regulating valve 43. After take-off, the compressed air from valves 32 and 43 is used to pressurise the passenger cabins and crew quarters, which are represented as 36, 37 and 38 in FIG. 4.

The compressed air would have passed through heat exchangers (not shown in FIG. 4), which are already located in the aircraft air conditioning system, so that the air was at the required temperature before entering the aircraft passenger cabins.

Some high pressure compressed air would be diverted by valve 33, at a pressure of 29 psi, to a small nitrogen enrichment unit 34. The highly enriched nitrogen air 35 from the gas separation unit 34 would be used as the inert atmosphere inside the fuel tanks of the aircraft and in any other non-passenger areas that would benefit from an inert atmosphere, such as engineering and control departments The small amount of oxygen rich air from the nitrogen enrichment unit 34 could be passed into the cabin air supply system.

In FIG. 4, the oxygen enrichment unit is located in the cabin air recirculation system. As stale air is drawn from the enclosed spaces 36, 37 and 38, the air passes through a filter 39 to remove aerosols and dust. The stale air is at the standard cabin pressure of about 10.8 psi.

The filtered air enters an oxygen enrichment unit 41 and passes around the outsides of the hollow fibre membranes in unit 41. A vacuum pump 42 applies a 0.5 atmosphere differential pressure to the inside cores of the hollow fibre membranes, so that air is drawn through the membranes and the air is selectively enriched with oxygen. The oxygen enrichment unit would have permeate chambers situated at each end of the hollow fibre membranes so that the oxygen rich air can be efficiently evacuated by the vacuum pump 42.

The vacuum pump 42 feeds the permeate oxygen rich air, which has a composition of about 29% oxygen, 71% nitrogen, to the regulating valve 43, where the oxygen rich air is diluted with fresh compressed air until it is at the required cabin composition of 25% oxygen, 75% nitrogen and at the required cabin pressure of 10.8 psi. Oxygen sensor 44 measures the oxygen concentration of the mixed air before the enriched oxygen air is fed to the enclosed spaces 36, 37 and 38.

The retentate nitrogen rich air from the gas separation unit 41 is discharged from the aircraft by the air outflow valve 40, which also helps to regulate the cabin pressure.

The pressure, temperature and flow rate of the enriched oxygen air will be continually monitored and controlled by equipment already installed in the existing air conditioning system, so that on entering the enclosed spaces 36, 37 and 38 the enriched oxygen air will provide a comfortable environment for passengers and crew.

The concentration of carbon dioxide in the stale air from the aircraft cabins is at a very low level, i.e. less than 3%. It is difficult to separate or concentrate low level constituents from gas mixtures when using highly permeable hollow fibre gas separation membranes, and it is therefore unlikely that the oxygen enrichment unit 41 would be able to concentrate carbon dioxide to an unacceptable level in the permeate gas stream.

A supply of enriched oxygen air would be a significant beneficial aid to prevent hypoxia in passengers, particularly during long-haul flights. Enriched oxygen air in the cockpit of the aircraft would also help to improve the concentration and alertness of the aircrew, whilst enriched oxygen air in galleys and crew quarters would help to prevent fatigue in cabin crew.

Both the oxygen and the nitrogen enrichment units operate at relatively low differential pressures. There are many thousands of hollow fibre membranes inside a typical gas separation unit and a failure of a small number of membranes would have very little effect on the enrichment system. Even if there was a complete failure of all the membranes inside a gas separation unit, which is extremely unlikely, the system would simply revert back to producing air with a normal atmospheric composition of 21% oxygen, 79% nitrogen.

From a further aspect, therefore, both the oxygen enrichment and the nitrogen enrichment units would be safe to use on board aircraft. The concentration of oxygen in the enriched oxygen air produced by the oxygen enrichment unit is never at a level that could cause spontaneous combustion or be hazardous in any way. The enrichment units operate at safe, controlled pressures and there is very little risk of a pressure blow-out during operation.

The enriched nitrogen air from the nitrogen enhancement unit consists of 10% oxygen, 90% nitrogen and is very inert. The nitrogen rich air is therefore ready for use as an inert atmosphere inside non-passenger areas of the aircraft, such as the fuel tanks, engineering sections and aircraft control departments, where it would provide an extra safety precaution against the risk of fire or explosion.

So far, the potential benefits of having an enriched oxygen atmosphere inside an aircraft have concentrated on the improvements that oxygen rich air could make to the health and well-being of the passengers and crew on board the aircraft.

However, instead of using the enriched oxygen air to improve the quality of the breathable air inside the aircraft, the increased partial pressure of oxygen resulting from the supply of oxygen rich air to the passenger cabins of the aircraft could be used to allow adjustment of the pressurisation of the aircraft.

Aircraft are normally pressurised so as to equate to the ambient pressure at a height of 8000 feet, i.e. about 2400 meters. The ambient pressure at this height, and hence the pressure inside the aircraft, would therefore be about 76 kPa.

As mentioned earlier, supplying enriched oxygen air with a composition of 25% oxygen, 75% nitrogen to the passenger cabins of a normally pressurised aircraft is equivalent to reducing the flying height by about 1400 meters.

Increasing the oxygen content of the air inside the aircraft by 4% could therefore be utilised operationally by reducing aircraft pressurisation to the ambient pressure existing at a height of say 3800 meters, i.e. about 63 kPa, without making passengers more vulnerable to hypoxia than they are at present.

Lowering the pressure inside the aircraft would reduce the amount of engine power required to compress the ambient air, which in turn would improve fuel consumption. The differential pressure between the internal pressure of the aircraft and the external ambient pressure at cruising altitude would also be correspondingly reduced. This would improve operational safety, in so far as the airframe of the aircraft would be subjected to less stress during the frequent pressurisations and de-pressurisations carried out over the life of the aircraft.

Alternatively, the change in the partial pressure of oxygen inside the aircraft, through the use of enriched oxygen air containing say 4% extra oxygen, could be utilised operationally by flying the aircraft at a correspondingly higher cruising altitude, i.e. an altitude about 1400 meters higher, which would also improve fuel consumption.

Airlines could therefore use an enriched oxygen atmosphere inside aircraft to either improve the quality of the air supplied to their passengers or to improve the operational performance of their aircraft. The choice will probably depend on whether or not the incidences of apparent hypoxia related illnesses increase to the extent that passengers become concerned about air travel. Law suits and damage claims arising from hypoxia related illnesses could also force airlines to consider ways of improving the health and safety of their passengers, particularly during long flights, by supplying better quality air to passengers on board their aircraft.

The gas separation system of the invention, albeit smaller in size, could also be used in small non-pressurised or partially pressurised aircraft that fly at lower altitudes. Supplying an enriched oxygen atmosphere to the passenger cabins inside these types of aircraft would allow the aircraft to be flown more economically at a higher altitude, for example, 4500 meters instead of 3000 meters.

The invention claimed is:

1. A method of supplying oxygen rich air to the passengers and crew on board a passenger aircraft by means of a highly permeable oxygen enrichment unit comprising hollow fibre membranes, wherein fibre tubes of the hollow fibre membranes used to separate normal air into oxygen rich and nitrogen rich fractions in the oxygen enrichment unit are subjected to a modification technique that increases the porosity of the fibre tubes to provide the tubes with a higher gas permeability before the tubes are coated with a selective polymer.

2. A method of supplying inert nitrogen rich air to the fuel tanks or other areas of an aircraft by means of a highly selective nitrogen enrichment unit comprising hollow fibre membranes, wherein fibre tubes of the hollow fibre membranes used to separate normal air into nitrogen rich and oxygen rich fractions in the nitrogen enrichment unit are subjected to a modification technique that increases the porosity of the fibre tubes to provide the tubes with a higher gas permeability before the tubes are coated with a selective polymer.

3. A method as claimed in claim 1, wherein the fibre tubes of the hollow fibre membranes are manufactured from polyethersulfone polymer material.

4. A method as claimed in claim 3, wherein the polyethersulfone polymer material is a fibre tube having a structure modified by soaking the tube in a solvent solution until the solution has penetrated into the pores of the fibre tube followed by displacement of the solution from the pores of the fibre tube with distilled water and then drying the water from the pores of the tube.

5. A method as claimed in claim 4, wherein the application of the modification technique to the fibre tube results in the fibre tube having up to twice as many pores in its structure than unmodified fibre tube and a gas permeability up to twice that of unmodified fibre tube.

6. A method as claimed in claim 4, wherein the application of the modification technique to the fibre tube improves the surface characteristics of the fibre tube so that the outer surface of the tube is able to support a very thin, uniform, defect free layer of the selective polymer.

7. A method as claimed in claim 1, wherein the selective polymer consists of a mixture of non cross-linked polydimethylsiloxane and cross-linked polydimethylsiloxane.

8. A method as claimed in claim 1, wherein the oxygen enrichment hollow fibre membranes are packed inside a gas separation module and multiples of gas separation modules are connected together in parallel to form the oxygen enrichment unit.

9. A method as claimed in claim 8, wherein the oxygen enrichment gas separation modules are manufactured from relatively lightweight, pressure resistant materials.

10. A method as claimed in claim 1, wherein the pressure to effect gas separation in the oxygen enrichment unit is either a positive pressure differential of up to about 30 psi applied to the outside of the hollow fibre membranes or a negative pressure differential of about 0.5 atmospheres applied to the inner cores of the membranes.

11. A method as claimed in claim 1, wherein the oxygen enrichment unit can produce up to 79.7 $m^3$/minute of enriched oxygen air with a composition of 29.5% oxygen, 70.5% nitrogen.

12. A method as claimed in claim 1, wherein the enriched oxygen air from the oxygen enrichment unit is diluted with compressed normal air to provide enriched oxygen air with a composition of 25% oxygen, 75% nitrogen.

13. A method as claimed in claim 12 wherein, after dilution, the available supply of enriched oxygen air with a composition of 25% oxygen, 75% nitrogen is up to 167 m³/minute.

14. A method as claimed in claim 1, wherein the oxygen rich fraction has a composition of 25% oxygen, 75% nitrogen and is fed into an air supply system leading to passenger cabins and crew quarters of the aircraft.

15. A method as claimed in claim 1, wherein the oxygen enrichment unit is located in a part an aircraft air conditioning system that takes fresh compressed air from the engines of the aircraft.

16. A method as claimed in claim 1, wherein the oxygen enrichment unit is located in a part of an aircraft air conditioning system that recirculates stale air back to passenger cabins of the aircraft.

17. A method as claimed in claim 2, wherein nitrogen enrichment hollow fibre membranes are packed inside a gas separation module and a small number of gas separation modules are connected together in parallel to form the nitrogen enrichment unit.

18. A method as claimed in claim 17, wherein the gas separation modules are manufactured from relatively lightweight, pressure resistant materials.

19. A method as claimed in claim 2, wherein the pressure to effect gas separation in the nitrogen enrichment unit is a positive pressure differential of about 29 psi applied to the outside of the hollow fibre membranes in the nitrogen enrichment unit.

20. A method as claimed in claim 2, wherein the nitrogen enrichment unit can produce up to 22 m³/hour of enriched nitrogen air with a composition of 10% oxygen, 90% nitrogen.

21. A method as claimed in claim 2, wherein the air highly enriched with nitrogen is used to provide an inert atmosphere in the fuel tanks of the aircraft and in other non-passenger areas.

22. A method as claimed in claim 2, wherein the nitrogen enrichment unit is located in a part of an aircraft air conditioning system that takes fresh compressed air from the engines of the aircraft.

23. An oxygen enrichment system for supplying enriched oxygen air to passenger cabins and crew quarters of a passenger aircraft, consisting of multiples of gas separation modules connected together in parallel, said modules containing composite hollow fibre membranes, means to supply compressed normal air to the outside of the membranes to effect gas separation, or alternatively a vacuum pump to apply a differential pressure to the inner core of the membranes, means to control the temperature of the compressed normal air, means to adjust the oxygen content of the enriched oxygen air produced by the gas separation modules by dilution with compressed normal air, means to introduce the diluted enriched oxygen air into an aircraft air conditioning system so that the enriched oxygen air is mixed with recirculating used cabin air, and means to control the pressure, temperature and flow rate of the enriched oxygen air supplied to the passenger cabins and crew quarters of the aircraft;
wherein said composite hollow fibre membranes are formed by subjecting fibre tubes to a modification technique that increases the porosity of the fibre tubes so as to provide the tubes with a higher gas permeability and then coating the tubes with a gas selective polymer.

24. A nitrogen enrichment system for supplying air enriched with nitrogen to fuel tanks or other non-passenger areas on board an aircraft consisting of one or more of gas separation modules connected together in parallel, said modules containing composite hollow fibre membranes, means to supply compressed air to the outside of the membranes to effect gas separation inside the gas separation module and means to supply nitrogen rich air from the gas separation module to the fuel tanks or other non-passenger areas of the aircraft;
wherein said composite hollow fibre membranes are formed by subjecting fibre tubes to a modification technique that increases the porosity of the fibre tubes so as to provide the tubes with a higher gas permeability and then coating the tubes with a gas selective polymer.

25. A method as claimed in claim 9, wherein the oxygen enrichment gas separation modules are manufactured from plastics, lightweight metals or combinations of such materials.

26. A method as claimed in claim 18, wherein the gas separation modules are manufactured from plastics, lightweight metals or combinations of such materials.

27. A method as claimed in claim 21, wherein the air highly enriched with nitrogen is used to provide an inert atmosphere in aircraft engineering and control departments, which could also benefit from an inert atmosphere.

28. The method of claim 2, wherein the coating on the hollow fibre membranes is then subjected to a plasma treatment technique.

29. The method of claim 28, wherein the plasma treatment technique consists of placing coated hollow fibre tubes between two cooled copper electrodes in a chamber containing a plasma forming gas, applying a voltage to produce a high-frequency plasma discharge and subjecting the coated tubes to the plasma discharge for about 10 seconds.

30. The method of claim 29, wherein the high-frequency plasma discharge is produced by applying a voltage of 500 volts.

31. The method of claim 29, wherein the plasma treatment technique is repeated until the hollow fibre membranes have attained the required selectivity properties to enable the gas separation membranes to produce air highly enriched with nitrogen.

32. The method of claim 29, wherein the plasma forming gas is nitrogen, oxygen, argon, helium or carbon dioxide, or mixtures thereof.

33. The method of claim 4, wherein the solvent solution is composed of 50% acetone and 50% water.

34. The oxygen enrichment system of claim 23, wherein the means to control the temperature of the compressed normal air controls the air to be at about 20° C.

35. The oxygen enrichment system of claim 23, wherein the compressed normal air applied to the outside of the membranes is at a pressure of up to 30 psi.

36. The oxygen enrichment system of claim 23, wherein the differential pressure applied to the inner core of the membranes is 0.5 atmosphere.

37. The nitrogen enrichment system of claim 24, wherein the means to supply compressed air supplies compressed air at a pressure of about 29 psi and a temperature of about 20° C.

38. A method of supplying inert nitrogen rich air to the fuel tanks or other areas of an aircraft by means of a highly selective nitrogen enrichment unit comprising hollow fibre membranes, wherein fibre tubes of the hollow fibre membranes used to separate normal air into nitrogen rich and oxygen rich fractions into the nitrogen enrichment unit are subjected to a modification technique before the tubes are coated with a selective polymer, and wherein the coating on the hollow fibre membranes is then subjected to a plasma treatment technique;

wherein the plasma treatment technique consists of placing coating hollow fibre tubes between two cooled copper electrodes in a chamber containing a plasma forming gas, applying a voltage to produce a high-frequency plasma discharge and subjecting the coating tubes to the plasma discharge for about 10 seconds.

39. The method of claim 38, wherein the high-frequency plasma discharge is produced by applying a voltage of 500 volts.

40. The method of claim 38, wherein the plasma treatment technique is repeated until the hollow fibre membranes have attained the required selectivity properties to enable the gas separation membranes to produce air highly enriched with nitrogen.

41. The method of claim 38, wherein the plasma forming gas is nitrogen, oxygen, argon, helium or carbon dioxide, or mixtures thereof.

* * * * *